United States Patent [19]

Bartos

[11] 4,252,915

[45] Feb. 24, 1981

[54] METHOD OF BLENDING ETHYLENE VINYLACETATE COPOLYMERS AND POLYDIORGANOSILOXANE GUMS AND THE BLENDS MADE BY THE METHOD

[75] Inventor: Donald M. Bartos, Midland, Mich.

[73] Assignee: Dow Corning Corporation, Midland, Mich.

[21] Appl. No.: 7,870

[22] Filed: Jan. 31, 1979

[51] Int. Cl.$^3$ .................. C08L 83/06; C08L 23/08
[52] U.S. Cl. .................. 525/106; 428/447; 428/450; 428/463
[58] Field of Search .................. 260/827; 525/106

[56] References Cited

U.S. PATENT DOCUMENTS

| 2,888,419 | 5/1959 | Safford | 260/29.1 |
|---|---|---|---|
| 2,888,424 | 5/1959 | Precopio et al. | 260/42.26 |
| 2,930,083 | 3/1960 | Vostovich et al. | 260/827 |
| 3,227,777 | 1/1966 | Safford | 260/827 |
| 3,798,185 | 3/1974 | Skiens et al. | 260/827 |
| 3,865,897 | 2/1975 | Falender et al. | 260/827 |
| 3,975,455 | 8/1976 | Falender et al. | 260/827 |
| 3,979,356 | 9/1976 | Walters | 260/827 |

FOREIGN PATENT DOCUMENTS

| 223547 | 8/1959 | Australia | 260/827 |
|---|---|---|---|
| 1294986 | 11/1972 | United Kingdom | 260/827 |

*Primary Examiner*—Wilbert J. Briggs, Sr.
*Attorney, Agent, or Firm*—James E. Bittell

[57] ABSTRACT

A processable, stable, homogeneous blend is obtained by mechanically mixing a polydiorganosiloxane gum containing 0.2 to less than 1.5 mol percent silicon atoms having vinyl or allyl groups with an ethylene vinylacetate copolymer containing 8 to 35 weight percent copolymerized vinylacetate. The polymers are mixed at a shear rate greater than 10 sec$^{-1}$, at a temperature between 170° C. and 235° C. and for a period of time sufficient to obtain at least 10 weight percent of the total blend of material which is insoluble in refluxing xylene.

6 Claims, No Drawings

METHOD OF BLENDING ETHYLENE VINYLACETATE COPOLYMERS AND POLYDIORGANOSILOXANE GUMS AND THE BLENDS MADE BY THE METHOD

BACKGROUND OF THE INVENTION

1. Field of the Invention

This invention relates to a method of blending ethylene vinylacetate copolymers and polydiorganosiloxane gums and to the thermoplastic blends produced.

2. Description of Prior Art

Many useful materials have been obtained by blending polydiorganosiloxanes and polyethylenes to achieve new combinations of properties. Since the polymers are generally incompatible, it is often difficult to obtain stable, useful blends. Consequently, techniques such as block or graft copolymerization may be necessary to hold the polymers together in a useful state.

Safford in U.S. Pat. No. 2,888,419 and Precopio et al. in U.S. Pat. No. 2,888,424 teach that polyethylene, filler and organopolysiloxane, which may be highly viscous masses of gummy elastic solids, can be intimately mixed at temperatures up to 135° C. to provide a more extrudible composition with less nerve and improved aging characteristics. They teach that the filler acts as a blending aid for these two polymers which results in a homogeneous product which is difficult to otherwise obtain. Vostovich et al. in U.S. Pat. No. 2,930,083 teach that improved processing of gelled or crosslinked polyethylene can be obtained by mixing gelled polyethylene and organopolysiloxanes which are highly viscous masses to gummy elastic solids on a mill or Banbury mixer at 220° F. for four minutes.

Safford in U.S. Pat. No. 3,227,777 teaches vulcanizing ethylene-propylene copolymers with an alkenylpolysiloxane and a bis(aralkyl) peroxide. Safford mills the copolymer of ethylene and propylene with the alkenylpolysiloxane and peroxide and thereafter vulcanizes the resulting mixture at 100° C. to 175° C. The properties of good heat resistance, electrical properties are due to the cured state of the ethylene-propylene copolymers.

Skiens et al. in U.S. Pat. No. 3,798,185 teaches the incorporation of polyorganosiloxanes in certain thermoplastics which are compatible at elevated melt temperatures and which have an oxygen permeability constant of at least about $0.5 \times 10^{-10}$ cc. cm/cm$^2$ sec cm Hg. The uniform melt is extruded as a blend to produce a membrane with improved gas permeability. Skiens further teaches that useful thermoplastics include ethylene vinylacetate copolymers, but that poly-alpha-olefins such as poly-4-methylpentene-1 are preferred. Skiens also teaches that the polydiorganosiloxane liquids used may be quite viscous, but siloxanes having a low viscosity at ambient temperature are preferred.

British Pat. No. 1,294,986 teaches incorporating silicone fluid with a viscosity not greater than 100 centistokes at 25° C. in ethylene or ethylene copolymers such as ethylene vinylacetate copolymers to improve the ionization resistance of the blend. It is taught that adding silicone gums to such polymers has an adverse effect on the mixing characteristics.

Falender et al. in U.S. Pat. No. 3,865,897 teach a method of combining certain polyolefins and high viscosity silicone gums that overcomes the adverse mixing characteristics and gives an improved blend. They teach that when polyethylene or ethylene vinylacetate copolymer containing up to 10 weight percent vinylacetate and a polydiorganosiloxane gum containing from 1.5 to 17 mol percent of siloxane units having vinyl or allyl groups are mechanically mixed under certain conditions of shear and temperature, a graft copolymer is formed which results in an improved blend. Falender et al. further teach that employing polydiorganosiloxane gums which contain vinyl and allyl contents outside the above stated limits produces inferior products, e.g. poor blends which tend to separate even after processing. While the blends taught by Falender et al. possess many advantageous and useful properties, commercial utilization of the blends has been slow because of the high vinyl content required in the polydiorganosiloxane gum. The alkylvinylsiloxane units of the siloxane are more difficult to obtain, have a more limited availability and cost more than the dialkylsiloxane units. This limits the commercial use of the blends of Falender et al. to relatively few areas.

It is one of the purposes of the present invention then to provide a method of obtaining an improved blend of a low vinyl or allyl content polydiorganosiloxane gum and an ethylene vinylacetate copolymer. Another purpose of the present invention is to provide a method of mechanically mixing a low vinyl or allyl content polydiorganosiloxane gum and an ethylene vinylacetate copolymer to obtain an improved blend containing graft copolymer. These purposes and others will be apparent from the detailed description of the invention.

SUMMARY OF THE INVENTION

This invention relates to a method of blending a polydiorganosiloxane gum and an ethylene vinylacetate copolymer comprising mechanically mixing 10 to 175 parts by weight of a polydiorganosiloxane gum and 100 parts by weight of an ethylene vinylacetate copolymer at a temperature of 170° to 235° C., at a shear rate greater than 10 sec$^{-1}$ and for a period of time sufficient to obtain at least 10 weight percent of the total blend of material which is insoluble in refluxing xylene, and thereafter recovering a processable, stable homogeneous blend, the ethylene vinylacetate copolymer containing 8 to 35 weight percent copolymerized vinylacetate and the polydiorganosiloxane gum being a toluene soluble gum having a Williams plasticity greater than 0.020 inch, with a ratio of organic groups per silicon atoms of about two wherein the organic groups are selected from methyl, phenyl, vinyl and allyl with from 0.2 to less than 1.5 mol percent of the silicon atoms having vinyl or allyl groups and no more than 50 percent of the organic groups being phenyl.

This invention also relates to the compositions obtained from this method which are processable by conventional methods employed in fabricating thermoplastics, which have electrical properties making them useful for insulation on wire and cable, and which are compatible with other thermoplastics so that they can be used as an additive to other thermoplastics to modify the properties of the thermoplastic.

DETAILED DESCRIPTION OF THE INVENTION

The ethylene-vinylacetate copolymers suitable for use in this invention are solids at ambient conditions and thermoplastic so that they are useful in fabricating materials such as molded articles, extruded articles, drawn articles and the like. Suitable ethylene vinylacetate copolymers contain about 8 to 35 weight percent copolymerized vinylacetate units based on the total weight of the copolymer. Ethylene vinylacetate copolymers which contain vinylacetate units outside the above limits provide inferior blends with polydiorganosiloxanes containing low vinyl or allyl contents. Such blends have lower tensile strengths and are sticky and cheesy in texture which makes processing difficult. Generally for ease of operation, ethylene vinylacetate copolymers which contain 15 to 30 weight percent vinylacetate units are preferred.

The polydiorganosiloxane gums suitable for this invention are those toluene soluble gums having a Williams plasticity greater than 0.020 inch. These gums consist essentially of diorganosiloxane units and thus have a ratio of organic groups per silicon atom of about two. Other siloxane units may be present in minor amounts, for example triorganosiloxane units used for endblocking, small amounts of mono-organosiloxane and $SiO_2$ units which are often found in polydiorganosiloxane gums but are present in amounts small enough so that the gums do not become insoluble. The organic groups of the gums are selected from methyl, phenyl, vinyl and allyl which are present as diorganosiloxane units such as dimethylsiloxane units, methylphenylsiloxane units, diphenylsiloxane units, methylvinylsiloxane units, methylallylsiloxane units and phenylvinylsiloxane units. Any other siloxane units present contain the same organic units as the diorganosiloxane units. The polydiorganosiloxane molecules are preferably endblocked with triorganosiloxane units or hydroxyl groups, however, because the number of end groups on these high molecular weight molecules represent an insignificant amount of the total gum composition, other endblocking groups can be present without departing from the scope of this invention because their effect would be insignificant.

The polydiorganosiloxane gums suitable for this invention have low vinyl or allyl contents with 0.2 to less than 1.5 mol percent of the silicon atoms having vinyl or allyl groups, preferably vinyl groups. Blends prepared from gums with vinyl or allyl contents below the above stated limit are inferior, possessing poor strength and tending to be sticky and difficult to process. While blends may be prepared from gums with vinyl or allyl content above the stated limit, such blends are less economical because of the more limited availability of high vinyl or allyl content gums. It is preferred for economy to employ polydiorganosiloxane gums with 0.2 to 1.0 mol percent of silicon atoms having vinyl or allyl groups.

In the method of this invention 10 to 175 parts by weight of the polydiorganosiloxane gum is mixed with 100 parts by weight of the ethylene vinylacetate copolymer. When the blends prepared by the method of this invention are to be used as an additive to other thermoplastics, it is preferred to mix 100 to 160 parts by weight of the polydiorganosiloxane gum with 100 parts by weight of the ethylene vinylacetate copolymer.

A stable blend of the above defined polyolefins and polydiorganosiloxane gums can be made by mechanically mixing them under certain specified conditions. By a stable blend it is meant that the blend is homogeneous, does not separate at ambient conditions into respective layers or one material does not exude from the other, and that the blend can be used over a reasonable temperature range without exudation or separation.

The conditions at which these stable blends can be made are such that the mechanical mixing has a shear rate greater than $10 \sec^{-1}$. The shear rate is not critical, except that there be a shearing action taking place during the mixing of the polyolefin and the polydiorganosiloxane gum.

The temperature at which mixing is performed is critical and the range of temperatures suitable to produce the stable blends of this invention is 170° to 235° C. Mechanically mixing the defined polyolefin and the polydiorganosiloxane gums at a temperature below the critical range does not provide stable blends and no apparent grafting takes place. Mechanically mixing at a temperature above the critical range causes significant degradation of the polyolefin which is observed by discoloration and drastic deterioration of physical properties.

As the mechanical mixing of the polydiorganosiloxane gum and the ethylene vinylacetate copolymer is continued under shear and at a suitable temperature, the viscosity during mixing increases above the original viscosity and passes through a maximum viscosity. This maximum viscosity is the preferred point to stop the mixing, however, the blends wherein the mixing is continued for at least a period of time sufficient to obtain at least 10 weight percent of the total blend of material which is insoluble in refluxing xylene, are suitable, stable and useful blends. The time period necessary to obtain the maximum viscosity increase or at least 10 weight percent of the total blend of material which is insoluble in refluxing xylene varies with each type of mixing equipment, each size of mixer, each mixer geometry, and the temperature within the specified range. For many types of mixing equipment, the time will vary from about 2 to 15 minutes. With any specific combination of equipment, ethylene vinylacetate copolymer and polydiorganosiloxane gum, at least one run should be made in which the viscosity change during the mixing is observed to determine the optimum mixing period.

Any suitable viscosity determination and measuring technique can be used. Because some viscosity measuring techniques are more suitable for one mixer than another, the best viscosity measuring technique should be used for the particular equipment design. The only requirement is that the viscosity be measured at mixing conditions, that is, under shear and at temperature.

Alternatively, the optimum mixing period may be determined by measuring the weight percent of the total blend material which is insoluble in refluxing xylene for material that has been mixed for different periods of time. The optimum being that period resulting in the highest percent insoluble material.

The particular types of mixers suitable for this invention are not critical insofar as they provide shearing action. Thus, a mill, a Banbury mixer, a Brabender Plasti-Corder ®, a compounding extruder and the like can be used.

The blends of this method are stable, homogeneous blends which are readily formed into dry, nonsticky pellets which can be easily processed by conventional fabricating techniques. These blends have good electrical properties so that they are suitable insulation for electrical wire and cable. These blends can be used in applications wherein gas permeability is required such as in medical applications. The gas permeability can be varied by composition variation. The blends of this invention are more compatible with other thermoplastics than unblended polydiorganosiloxane gums and can be added to other thermoplastics to modify their electrical, flexibility, gas permeability or other properties.

The blends of this invention can be crosslinked by conventional means such as with organic peroxides, ultraviolet radiation, gamma radiation or sulfur.

The blends of this invention contain insoluble material which is believed to be graft copolymer which is formed during the mechanical mixing. These graft copolymers are thought to provide the improved stability and homogeneity of the instant blends. More specifically it appears that the presence of the stated levels of vinylacetate units in the ethylene vinylacetate copolymer facilitates formation of graft copolymer with polydiorganosiloxane gum with low vinyl or allyl content. While this theory is forwarded to help those skilled in the art to understand the invention, it should not be construed as limiting the present invention as claimed.

Similarly, the following examples are presented for illustrative purposes only and should not be construed as limiting the invention which is delineated in the claims.

maximum viscosity increase was obtained which was indicated by a maximum in the mixing torque.

Test sheets were prepared by press molding one sixteenth inch thick sheets for 10 minutes at 170° C. The properties of the blends were determined on the test sheets and are shown in Table 1. Williams plasticity was determined on a 4.2 g. sample, for 3 minutes at room temperature in accordance with ASTM-D-926-67 procedure. The ultimate tensile strength and elongation were determined in accordance with ASTM-D-638 procedure. The Shore A Durometer was determined in accordance with ASTM-2240 procedure. Blends were judged to possess good processability if they were dry and could be obtained in a non-sticky pellet form. Blends that were sticky and cheesy in texture were considered to possess poor processability. The gel content which is the weight percent of the total blend of material which is insoluble in refluxing xylene was determined by extracting the blends for 20 hours in refluxing xylene.

TABLE 1

| Ethylene Vinylacetate | Weight Percent Vinylacetate Copolymerized | Mixing Time (minutes) | Ultimate Tensile (Pa $\times 10^{-6}$) | Ultimate Elongation (percent) | Durometer | Processability | Gel Content (percent) |
|---|---|---|---|---|---|---|---|
| 1* | 4 | 9 | 0.17 | 10 | 10 | Poor | 6.2 |
| 2 | 9 | 13 | 2.21 | 90 | 63 | Good | 39 |
| 3 | 18 | 12 | 1.50 | 90 | 45 | Good | 29 |
| 4 | 28 | 6 | 2.72 | 550 | 42 | Good | 39 |
| 5* | 45 | 8 | 0.83 | 90 | 16 | Poor | — |

*Presented for comparative purposes.

EXAMPLE 1

This example compares blends prepared from several ethylene vinylacetate copolymers containing different amounts of copolymerized vinylacetate.

Blends were prepared by mixing 26.4 grams of a toluene soluble polydiorganosiloxane gum with 0.68 mol percent vinyl groups per silicon atom, having a Williams plasticity of about 0.06 inch and containing 99.32 mol percent dimethylsiloxane units, 0.57 mol percent methylvinylsiloxane units and 0.11 mol percent dimethylvinylsiloxane units and 17.6 grams of ethylene vinylacetate copolymer. The ethylene vinylacetate copolymers used were (1) Dow Polyethylene Resin 130 containing 4 weight percent copolymerized vinylacetate and sold by Dow Chemical Company, (2) Ultrathene ® UE 635 containing 9 weight percent copolymerized vinylacetate and sold by USI Chemicals, (3) Ultrathene ® UE 633 containing 18 weight percent copolymerized vinylacetate and sold by USI Chemicals, (4) Ultrathene ® UE 634 containing 28 weight percent copolymerized vinylacetate and sold by USI Chemicals, and (5) EY-903 containing 45 weight percent copolymerized vinylacetate and sold by USI Chemicals. The blends were prepared by mixing at 190° C. in a Brabender Plasti-Corder ® using a roller blade type head at 63 rpm. Each blend was mixed until the

EXAMPLE 2

This example compares blends prepared from several polydiorganosiloxane gums with different amounts of vinyl groups.

The blends were prepared as in Example 1 employing Urethene ® UE 634 (28% vinylacetate) and a toluene soluble polydiorganosiloxane gum having a Williams plasticity of about 0.06 inch. Gum (1) was the same as that employed in Example 1. Gum (2) contained 0.25 mol percent vinyl groups per silicon atom and was composed of 99.75 mol percent dimethylsiloxane units, 0.14 mol percent methylvinylsiloxane units, and 0.11 mol percent dimethylvinylsiloxane units. Gum (3) contained 0.12 mol percent vinyl groups per silicon atom and was composed of 99.88 mol percent dimethylsiloxane units and 0.12 mole percent dimethylvinylsiloxane units. Pressed sheets were prepared and tested as in Example 1. The results are shown in Table 2.

TABLE 2

| Polydiorganosiloxane Gum | Mol Percent Vinyl Groups | Mixing Time (minutes) | Ultimate Tensile (Pa $\times 10^{-6}$) | Ultimate Elongation (percent) | Durometer | Processability | Gel Content (Percent) |
|---|---|---|---|---|---|---|---|
| 1 | 0.68 | 6 | 2.72 | 550 | 42 | Good | 39 |
| 2 | 0.25 | 12 | 1.97 | 475 | 45 | Good | 17 |
| 3* | 0.12 | 11 | 0.17 | 50 | 11 | Poor | 0 |

*Presented for comparative purposes.

EXAMPLE 3

Three blends were prepared and tested as in Example 2 except that 16 grams of Ultrathene ® UE 633 (18% vinylacetate) and 24 grams of silicone gum were employed. The results are shown in Table 3.

TABLE 3

| Polydiorganosiloxane Gum | Mol Percent Vinyl Groups | Ultimate Tensile (Pa × 10⁻⁶) | Ultimate Elongation (percent) | Processability |
|---|---|---|---|---|
| 1 | 0.68 | 4.74 | 430 | Good |
| 2 | 0.25 | 1.57 | 160 | Good |
| 3* | 0.12 | 1.40 | 10 | Poor |

*Presented for comparative purposes.

EXAMPLE 4

Three blends were prepared as in Example 3 except that 20 grams of the polydiorganosiloxane gum and 20 grams of the ethylene vinylacetate copolymer were mixed. The blends were inspected for processability with the results shown in Table 4.

TABLE 4

| Polydiorganosiloxane Gum | Mol Percent Vinyl Groups | Processability |
|---|---|---|
| 1 | 0.68 | Good |
| 2 | 0.25 | Good |
| 3* | 0.12 | Poor |

*Presented for comparative purposes.

EXAMPLE 5

This example illustrates the preparation of a suitable blend by mixing less than the optimum period of time.

A blend was prepared employing Ultrathene® UE 634 (28% vinylacetate) and the polydiorganosiloxane gum described in Example 1. The blend was prepared as in Example 1 except that the blend was mixed for only 1 minute instead of the optimum 6 minutes as indicated in Example 1 for this combination of components and conditions. The blend obtained had good processability and a gel content of 13.6 percent.

EXAMPLE 6

This example shows a continuous preparation of a blend on a compounding extruder.

A blend was prepared by feeding about 36 pounds per hour of siloxane gum (1), described in Example 1, and 24 pounds per hour of Ultrathene® UE 633 to a Sentinel E-70 Twin-Screw extruder. The first zone of the extruder was maintained at 177° to 179° C., the second at 207° C., the third at 204° C., and die temperature was maintained at 207° to 210° C. The blend was obtained as pellets which upon cooling were dry and non-sticky. Test sheets were prepared by press molding one sixteenth inch thick sheets for 5 minutes at 175° C. The properties of the blend were determined as in Example 1 and were ultimate tensile $0.83 \times 10^6$ Pa, ultimate elongation 160 percent, durometer 30 and gel content 20 percent.

That which is claimed is:

1. A method of blending a polydiorganosiloxane gum and an ethylene vinylacetate copolymer comprising mechanically mixing 10 to 175 parts by weight of a polydiorganosiloxane gum and 100 parts by weight of an ethylene vinylacetate copolymer at a temperature of 170° to 235° C., at a shear rate greater than $10 \sec^{-1}$ and for a period of time sufficient to obtain at least 10 weight percent of the total blend of material which is insoluble in refluxing xylene, thereafter recovering a processable, stable homogeneous blend, the ethylene vinylacetate copolymer containing 8 to 35 weight percent copolymerized vinylacetate and the polydiorganosiloxane gum being a toluene soluble gum having a Williams plasticity greater than 0.020 inch, with a ratio of organic groups per silicon atom of about two wherein the organic groups are selected from methyl, phenyl, vinyl and allyl with from 0.2 to less than 1.5 mol percent of the silicon atoms having vinyl or allyl groups and no more than 50 percent of the organic groups being phenyl.

2. The processable, stable, homogeneous blend prepared by the method of claim 1.

3. The method in accordance with claim 1 in which 100 to 160 parts by weight of the polydiorganosiloxane is mixed with 100 parts by weight of the ethylene vinylacetate copolymer.

4. The method in accordance with claim 1 or 3 in which the ethylene vinylacetate copolymer contains 15 to 30 weight percent copolymerized vinylacetate.

5. The method in accordance with claim 4 in which the polydiorganosiloxane gum contains 0.2 to 1.0 mol percent of silicon atoms having vinyl or allyl groups.

6. The processable, stable, homogeneous blend prepared by the method of claim 5.

* * * * *